United States Patent
Corretjer et al.

(10) Patent No.: US 9,591,124 B2
(45) Date of Patent: Mar. 7, 2017

(54) METHOD AND SYSTEM FOR TRANSFERRING AN AUDIO SIGNAL BETWEEN DEVICES OF A SINGLE USER

(71) Applicant: MOTOROLA SOLUTIONS, INC, Schaumburg, IL (US)

(72) Inventors: Jesus F. Corretjer, Weston, FL (US); Stuart S Kreitzer, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 274 days.

(21) Appl. No.: 14/266,105

(22) Filed: Apr. 30, 2014

(65) Prior Publication Data
US 2015/0319298 A1  Nov. 5, 2015

(51) Int. Cl.
*H04W 4/22* (2009.01)
*H04W 84/08* (2009.01)
(Continued)

(52) U.S. Cl.
CPC ....... *H04M 3/2227* (2013.01); *H04M 1/7253* (2013.01); *H04M 3/2236* (2013.01);
(Continued)

(58) Field of Classification Search
CPC ............ H04M 3/2227; H04M 1/6066; H04M 2250/02; H04W 76/007; H04W 84/08; H04W 4/22; H04W 76/005
See application file for complete search history.

(56) References Cited

U.S. PATENT DOCUMENTS

| | | |
|---|---|---|
| 6,125,176 A | 9/2000 | Foladare et al. |
| 8,010,158 B2 | 8/2011 | Parkkinen et al. |

(Continued)

FOREIGN PATENT DOCUMENTS

| | | |
|---|---|---|
| CA | 2 654 538 C | 1/2013 |
| EP | 2 409 228 A1 | 1/2012 |

(Continued)

OTHER PUBLICATIONS

Motorola Solutions, Inc.—U.S. Appl. No. 14/220,877, filed Mar. 20, 2014.

(Continued)

*Primary Examiner* — Joseph Dean, Jr.
(74) *Attorney, Agent, or Firm* — Barbara R. Doutre

(57) ABSTRACT

A method, system and device enable transferring an audio signal between devices of a single user. The method includes pairing, over a master-less communication link, a narrowband communication device operating in a narrowband communication system and a broadband communication device operating in a broadband communication system. A call is then established between the narrowband communication device and the narrowband communication system or between the broadband communication device and the broadband communication system. Next, an audio quality parameter is determined at least one of the narrowband communication device and the broadband communication device. An audio signal of the call is then transmitted, over the master-less communication link and in response to the audio quality parameter, from one to the other of the broadband communication device and the narrowband communication device.

22 Claims, 3 Drawing Sheets

(51) Int. Cl.
*H04M 3/22* (2006.01)
*H04W 76/00* (2009.01)
*H04M 1/725* (2006.01)
*H04M 3/42* (2006.01)

(52) U.S. Cl.
CPC .......... *H04W 4/22* (2013.01); *H04W 76/005* (2013.01); *H04W 76/007* (2013.01); *H04W 84/08* (2013.01); *H04M 3/42263* (2013.01); *H04M 2250/02* (2013.01); *H04M 2250/06* (2013.01)

(56) References Cited

U.S. PATENT DOCUMENTS

| | | | |
|---|---|---|---|
| 8,483,101 B2 | 7/2013 | Albert et al. | |
| 8,504,090 B2 | 8/2013 | Klein | |
| 8,548,145 B2 | 10/2013 | White et al. | |
| 8,559,874 B2 | 10/2013 | Kermoian et al. | |
| 2008/0194279 A1* | 8/2008 | Choksi | H04W 72/005 455/518 |
| 2009/0052714 A1 | 2/2009 | Wilbur | |
| 2009/0094325 A1 | 4/2009 | Karia et al. | |
| 2009/0191822 A1* | 7/2009 | Chen | H04W 88/06 455/90.2 |
| 2009/0323655 A1 | 12/2009 | Cardona | |
| 2009/0323973 A1 | 12/2009 | Dyba | |
| 2010/0137015 A1 | 6/2010 | Blanco | |
| 2011/0111791 A1* | 5/2011 | Martz | H04W 88/04 455/552.1 |
| 2011/0237217 A1 | 9/2011 | Monks et al. | |
| 2011/0237287 A1* | 9/2011 | Klein | H04M 3/42178 455/521 |
| 2011/0238726 A1 | 9/2011 | Klein | |
| 2013/0021176 A1 | 1/2013 | Tu et al. | |
| 2013/0046534 A1* | 2/2013 | Rabipour | H04M 7/0072 704/219 |
| 2013/0117457 A1 | 5/2013 | Allen et al. | |
| 2013/0244714 A1 | 9/2013 | Klein | |
| 2013/0300817 A1 | 11/2013 | Naidu et al. | |
| 2014/0177457 A1* | 6/2014 | Grosspietsch | H04W 24/02 370/252 |
| 2015/0004927 A1* | 1/2015 | Mao | H04W 72/10 455/404.2 |
| 2015/0148088 A1 | 5/2015 | Ericson | |
| 2015/0365525 A1 | 12/2015 | Liu et al. | |

FOREIGN PATENT DOCUMENTS

| | | |
|---|---|---|
| EP | 2 409 229 A2 | 1/2012 |
| EP | 2 424 198 A2 | 2/2012 |
| EP | 2 464 166 A1 | 6/2012 |
| GB | 2 505 000 A | 2/2014 |
| WO | 2007/051489 A1 | 5/2007 |
| WO | 2013098262 A1 | 7/2013 |
| WO | 2013/182113 A2 | 12/2013 |

OTHER PUBLICATIONS

"Sprint Printable User Guide—Kyocera Torque," Retrieved from the Internet URL: http://support.sprint.com/global/pdf/user_guides/kyocera/torque/kyocera_torque_ug.pdf, retrieved on Jan. 27, 2016, "Phone Calls—Call Emergency Numbers," Copyright 2013 Sprint and Logo, "Kyocera," pp. 36-37.
Notice of Allowance mailed Aug. 21, 2015, in U.S. Appl. No. 14/220,877, Klein D.E. et al., filed Mar. 20, 2014.
Notice of Allowance mailed Jan. 13, 2016, in U.S. Appl. No. 14/220,877, Klein D.E. et al., filed Mar. 20, 2014.
International Search Report and Written Opinion for corresponding International Patent Application No. PCT/US2015/026579, mailed on Jul. 6, 2015.
International Search Report and Written Opinion for corresponding International Patent Application No. PCT/US2015/017917, mailed on Jun. 15, 2015.

* cited by examiner

METHOD AND SYSTEM FOR TRANSFERRING AN AUDIO SIGNAL BETWEEN DEVICES OF A SINGLE USER

BACKGROUND OF THE INVENTION

Public safety personnel, such as police officers, firefighters, paramedics and the like typically utilize numerous communication devices while working in the field. Public safety communication devices include, for example, mobile radios such as handheld radios and/or vehicular radios along with remote accessories, such as remote microphones, speakers, earpieces, headsets and the like. These primary mission critical devices and the infrastructure to support their operation are typically realized in the form of a narrowband communication system operating via a private network governed by a public safety agency.

Further, public safety personnel often carry additional non-mission critical devices, such as cell phones, personal digital assistants, electronic notepads and the like which operate over a broadband communication system. These secondary, non-mission critical devices are often used to monitor radio channels that are in addition to radio channels monitored using the primary, mission critical devices.

However, listening and responding to calls that are monitored and received on the broadband system can be problematic, particularly in noisy environments such as at incident scenes, as non-mission critical broadband devices often have significant limitations regarding the audio capabilities of in-built, consumer-grade speakers and microphones.

Accordingly, there is a need for an improved communication method and system for transferring an audio signal between devices of a single user.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
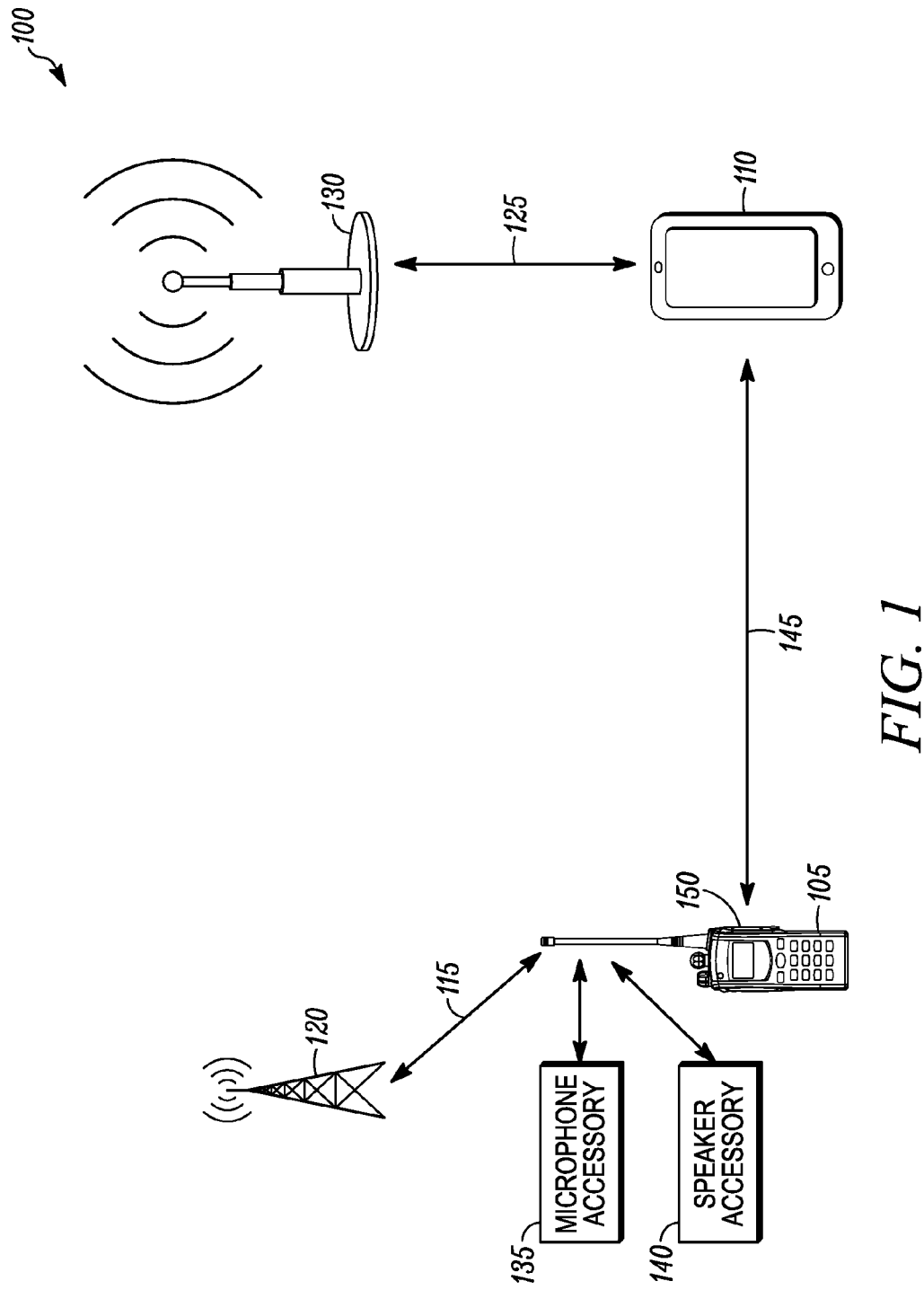
FIG. 1 is a schematic diagram illustrating a radio communication system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to some embodiments, the invention is a method for transferring audio between devices of a single user. The method includes pairing, over a master-less communication link, a narrowband communication device operating in a narrowband communication system and a broadband communication device operating in a broadband communication system. A call is then established between the narrowband communication device and the narrowband communication system or between the broadband communication device and the broadband communication system. Next, an audio quality parameter is determined at least one of the narrowband communication device and the broadband communication device. An audio signal of the call is then transmitted, over the master-less communication link and in response to the audio quality parameter, from one to the other of the broadband communication device and the narrowband communication device.

FIG. 1 is a schematic diagram illustrating a radio communication system 100, according to some embodiments. The system 100 includes at least one narrowband device 105 and at least one broadband device 110. The narrowband device 105 is connected via a wireless link 115 to a narrowband network 120, and the broadband device 110 is connected via a wireless link 125 to a broadband network 130. As understood by those skilled in the art, at least the broadband network 130 is then connected to various extended infrastructure such as the Internet. Further the narrowband device 105 and the broadband device 110 are connected to each other via a personal area network (PAN) link 145.

As an example, the narrowband network 120 may be a public safety network used by first responders such as police and fire personnel. The at least one narrowband device 105 and the at least one broadband device 110 can provide a plurality of communication devices for a single user, such as a first responder. The devices 105, 110 may be, for example, handheld devices, devices worn on or about a user's body, or devices in a vehicle so as to be under the immediate control of the user.

An example of the narrowband device 105 is a dedicated Land Mobile Radio (LMR) of a system such as a Project 25 (P25) or European Terrestrial Trunked Radio (TETRA) system that operates using a Common Air Interface (CAI) call format. The narrowband device 105 also may be coupled with various audio accessories such a microphone accessory 135 and a speaker accessory 140. For example, the microphone accessory 135 may be a "mask mic" integrated into an oxygen mask of a fireman's helmet. Alternatively, the microphone accessory 135 and the speaker accessory 140 may be both integrated into, for example, a headpiece, earpiece or a remote speaker microphone (RSM).

An example of the broadband device 110 is a conventional cell phone, and the wireless link 125 to the broadband network 130 can be established using private or public wireless networks such as 4G Long Term Evolution (LTE) networks or WiFi networks. The PAN link 145 connecting together the narrowband device 105 and the broadband device 110 can be established using various well known wireless standards and protocols such as Bluetooth, WiFi, or ZigBee operating in peer-to-peer mode.

Advantages of some embodiments include an ability to quickly and seamlessly transfer an audio signal from a first device to a second device, where both the first and second devices are operated by the same user, but where the second device has improved audio functionality. For example, in noisy, high-stress environments such as a public safety incident, the broadband device 110 may be unable to adequately reject background noise and cleanly transmit the user's voice. The broadband device 110 also may be unable to adequately play incoming audio signals, at quality and sound levels required for the noisy environmental conditions. Therefore, a "high-noise immunity" microphone and high quality speakers of the narrowband device 105, such as the microphone accessory 135 and a speaker accessory 140, can be used to enhance the audio quality of a call established on the broadband device 110. The audio signals of the call are routed over the PAN link 145, but the call can remain established on the broadband device 110 and there is no requirement to transfer the call to the narrowband device 105.

Thus, in one possible scenario the narrowband device 105 can be, for example, an LMR device of a police officer who is monitoring a dispatch channel for a local police department, and the broadband device 110 can be a cell phone of the same police officer that is monitoring call information and audio streams available over cellular or broadband via Rich Site Summary (RSS) syndication or similar data feeds from a statewide sheriff's system, which system is separate and independent of the system of the local police department. If the police officer is at an incident scene, where there may be significant background noise such as vehicle sirens or alarms, it can be very beneficial to utilize the superior audio and microphone capabilities or ratings of the officer's LMR device compared to the capabilities or ratings of the cell phone. However, it can also be beneficial for the police office to be able to continue with a call established on the cell phone, and without needing to transfer the call to the LMR device.

Determining whether background noise levels or other audio quality parameters require an audio signal to be transferred across the PAN link 145 can be performed in various ways. For example, both the narrowband device 105 and the broadband device 110 can sample environmental audio via their respective microphones. Each device 105, 110 can independently measure the ambient audio and determine an audio quality parameter or metric that is shared between the devices 105, 110 via the PAN link 145. If the ambient noise as measured by the audio quality parameter exceeds a predetermined threshold on either device 105, 110, a recommendation can be made to the user (or a switch can be made automatically) to use the high-performance audio capabilities of the narrowband device 105.

Alternatively, according to other embodiments, both devices 105, 110 can sample environmental audio signals via their respective microphones. Each device 105, 110 can independently measure the ambient audio and determine an audio quality parameter that is shared between the devices 105, 110 via the PAN link 145. If the ambient noise as measured by the audio quality parameter exceeds a threshold on both devices 105, 110, a recommendation can be made to the user (or a switch can be made automatically) to use the high-performance audio capabilities of the narrowband device 105.

Alternatively, according to still other embodiments, one of the devices 105, 110 can sample environmental audio via its microphone. The device 105, 110 that samples the audio then shares the audio samples or a calculated audio quality metric with the other device 105, 110 via the PAN link 145. If the ambient noise as measured by the audio quality metric exceeds a threshold, then a recommendation can be made to the user (or a switch can be made automatically) to use the high-performance audio capabilities of the narrowband device 105.

In further embodiments, a first microphone of the narrowband device 105 can be dedicated to push to talk (PTT) services when simultaneously a second microphone of the narrowband communication device provides an audio input signal path to the broadband device 110. For example, the first microphone can be an internal microphone of the narrowband device 105 and the second microphone can be an external microphone of the narrowband device 105, such as the microphone accessory 135.

Further, according to some embodiments, pressing a PTT button 150 of the narrowband device 105 can interrupt the audio input signal to the broadband device 110, and releasing the PTT button of the narrowband communication device can restore the audio input signal to the broadband device 110. These features enable the important and mission critical operation of the narrowband device 105 to not be interrupted or disabled when audio signals are shared over the PAN link 145. For example, the broadband device 110 can be using during a call a high performance microphone, such as the microphone accessory 135, of the narrowband device 105. Pressing the PTT button 150 on the narrowband device 105 interrupts the audio signal to the broadband device 110 and connects the high performance microphone back to the narrowband device 105 for mission-critical communications. Releasing the PTT button 150 then makes the high performance microphone again available to the broadband device 110.

The examples above all describe employing the superior audio capabilities of the narrowband device 105 when the audio capabilities of the broadband device 110 prove unsatisfactory. However, those skilled in the art will appreciate that in some circumstances a call established on the narrowband device 105 may require the audio capabilities of the broadband device 110. For example, an audio signal from a microphone of the broadband device 110 may be transmitted to the narrowband device 105 over the PAN link 145 when a microphone of the narrowband device 105 is broken or otherwise compromised. Further, high-performance microphones or other audio accessories can be connected directly to the broadband device 110 and shared with the narrowband device 105 over the PAN link 145.

Figure 2:
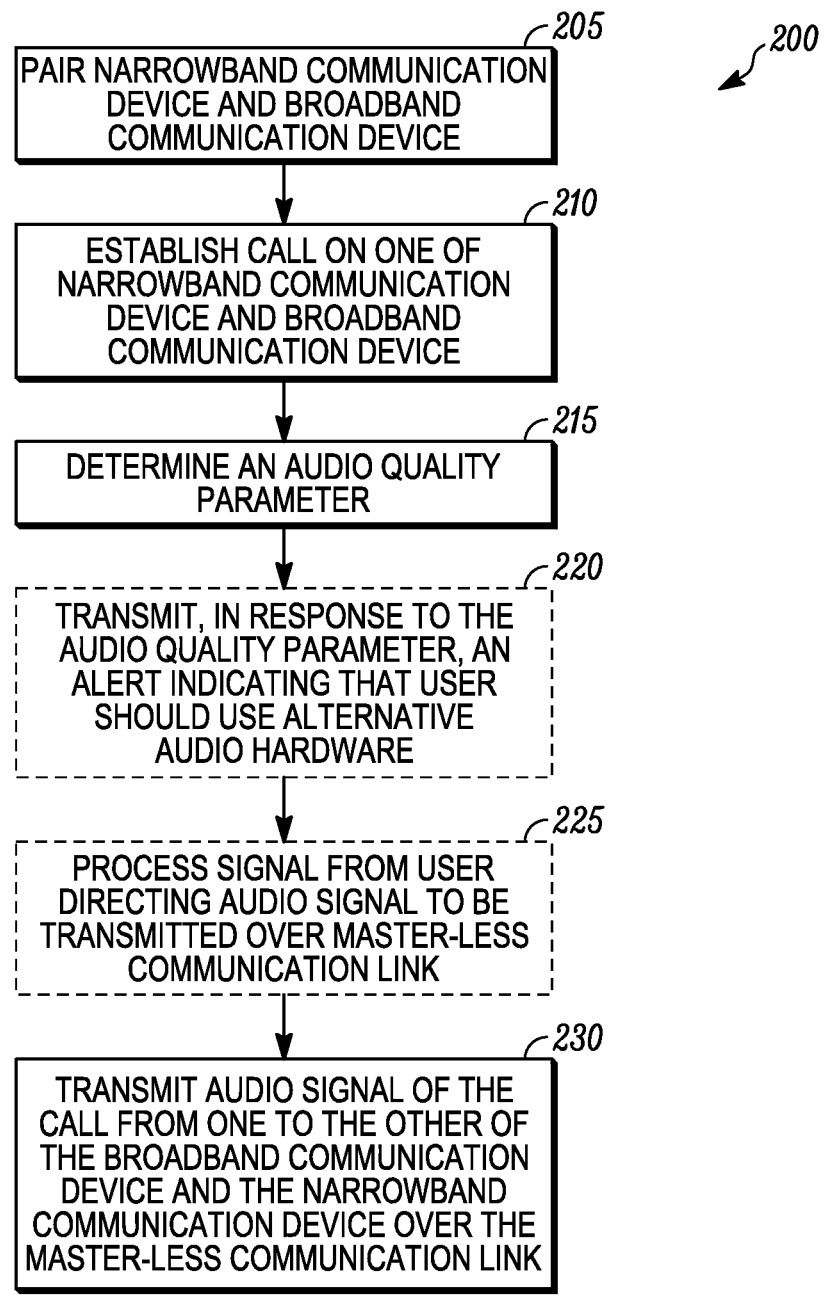
FIG. 2 is a flow diagram illustrating a method for transferring audio between devices of a single user, according to some embodiments.

FIG. 2 is a flow diagram illustrating a method 200 for transferring audio between devices of a single user, according to some embodiments. At block 205, a narrowband communication device operating in a narrowband communication system and a broadband communication device operating in a broadband communication system are paired over a master-less communication link. For example, the narrowband device 105 and the broadband device 110 are paired over the PAN link 145.

At block 210, a call is established between the narrowband communication device and the narrowband communication system or between the broadband communication device and the broadband communication system. For example, a call can be established between the broadband device 110 and the broadband network 130.

At block 215, an audio quality parameter is determined at least one of the narrowband communication device and the broadband communication device. For example, as described above, background noise levels can be sampled or an audio signal quality can be measured at either or both of the narrowband device 105 and the broadband device 110.

Optionally, at block 220, and in response to the audio quality parameter, an alert is transmitted to the user indicating that the user should use alternative audio hardware of one of the broadband communication device and the narrowband communication device. For example, such alerts can include, as well known in the art, audio, haptic, or visible light alerts transmitted from one or both of the narrowband device 105 and the broadband device 110 to the user.

Optionally, at block 225, one of the broadband communication device and the narrowband communication device processes a signal from the user directing the audio signal of the call to be transmitted, over the master-less communication link, from one to the other of the broadband communication device and the narrowband communication device. For example, a user can issue a verbal command into a microphone of either the narrowband device 105 or the broadband device 110, or can press a button on a keypad or display of either device 105, 110.

Blocks 220 and 225 are described above as optional, and thus are illustrated using dashed lines in FIG. 2, as according to alternative embodiments the system 100 can be programmed to automatically switch to alternative audio hardware based on the audio quality parameter.

At block 230, an audio signal of the call is transmitted over the master-less communication link and in response to the audio quality parameter, from one to the other of the broadband communication device and the narrowband communication device. For example, in response to the measurement of a high background noise level, signals from a "high-noise immunity" microphone and to high quality speakers of the narrowband device 105, such as the microphone accessory 135 and a speaker accessory 140, can be transmitted over the PAN link 145 to enhance the audio quality of a call established on the broadband device 110.

Figure 3:
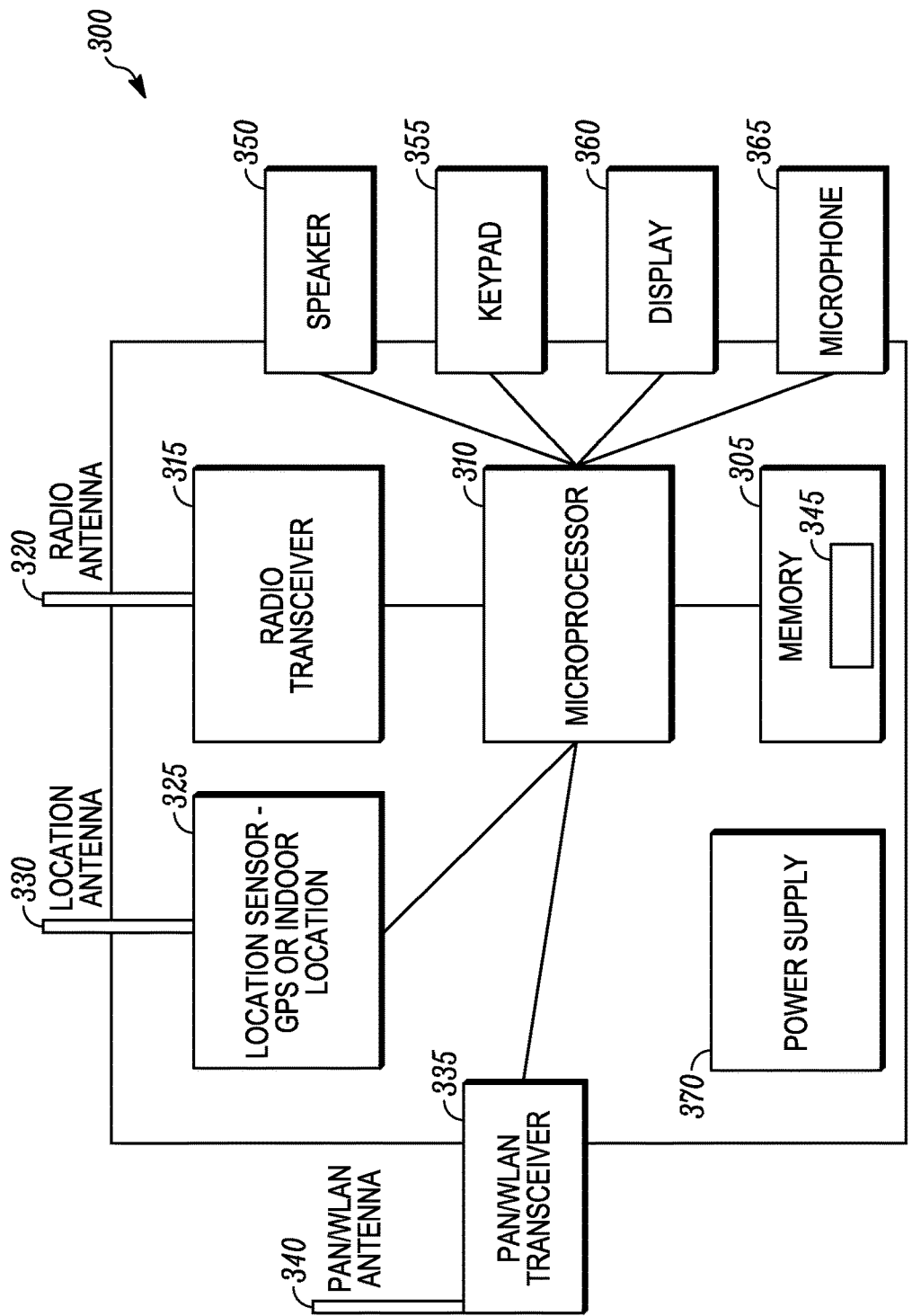
FIG. 3 is a block diagram illustrating components of an embodiment of a communication device, according to some embodiments.

FIG. 3 is a block diagram illustrating components of an embodiment of a communication device 300, according to some embodiments. For example, the narrowband device 105 and the broadband device 110 may each comprise similar components, architecture and capabilities as the communication device 300, but operating to their respective standards.

The device 300 comprises a memory 305 coupled to a microprocessor 310. The microprocessor 310 also has ports for coupling to a radio transceiver 315 having a radio antenna 320, a location sensor 325 having a location antenna 330, and a Personal Area Network (PAN)/Wireless Local Area Network (WLAN) transceiver 335 having a PAN/WLAN antenna 340. The location sensor 325 may include, for example, a Global Positioning System (GPS) location sensor or an indoor location sensor. In the narrowband device 105 the radio transceiver 315 communicates with a private narrowband network such as the narrowband network 120. In the broadband device 110 the radio transceiver 315 communicates with broadband infrastructure such as the broadband network 130.

The PAN/WLAN transceiver 335 enables two devices, such as the narrowband device 105 and the broadband device 110, to communicate with each other over a PAN or a wireless local area network (WLAN) using well known standards and protocols such as Bluetooth, WiFi or Zigbee. The PAN/WLAN transceiver 335 thus enables establishment of the PAN link 145 between the devices 105, 110, and transmission of audio signals between the devices 105, 110. Further, the PAN/WLAN transceiver 335 further enables wireless links between the narrowband device 105 and various audio accessories, such as the microphone accessory 135 and speaker accessory 140. As will be understood by those having ordinary skill in the art, such accessories 135, 140 also can be hard wired to the narrowband device 105.

The memory 305 can store operating code (OC) for the microprocessor 310 and code for performing functions associated with the narrowband device 105 or the broadband device 110. For example, the memory 305 can store computer readable program code components 345 configured to cause execution of a method, such as the method 200 described above, for transferring an audio signal between devices of a single user as described herein.

The microprocessor 310 is also connected to user interface elements such as a speaker 350, a keypad 355, a display screen 360 and a built-in microphone 365. Further, a power supply 370 provides power to the device 300.

Wireless portable electronic devices that utilize and benefit from embodiments of the present invention can utilize various types of wireless network architectures including a mesh enabled architecture (MEA) network, or an Institute of Electrical and Electronics Engineers (IEEE) 802.11 network (e.g., 802.11a, 802.11b, 802.11g, 802.11n). It will be appreciated by those of ordinary skill in the art that such wireless communication networks can alternatively comprise any packetized communication network where packets are forwarded across multiple wireless hops. For example, such a wireless communication network can be a network utilizing multiple access schemes such as OFDMA (orthogonal frequency division multiple access), TDMA (time division multiple access), FDMA (Frequency Division Multiple Access), or CSMA (Carrier Sense Multiple Access).

According to some embodiments, narrowband is defined as a limited-capacity transmission channel such as that used for transmitting low data rate audio signals or data signals. Examples of narrowband within a two-way radio environment include Private Land Mobile Radio (PLMR) devices that operate in a 25 kHz or 12.5 kHz bandwidth supporting voice or data operations.

According to some embodiments, broadband is defined as a high-capacity transmission technique using a wide range of frequencies, which enables a large number of messages to be communicated simultaneously.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a . . . ", "has a . . . ", "includes a . . . ", "contains a . . . " does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transferring audio between devices of a single user, the method comprising:
    pairing, over a personal area network (PAN) master-less communication link, a narrowband communication device operating in a narrowband communication system and a broadband communication device operating in a broadband communication system;
    establishing a call between the narrowband communication device and the narrowband communication system or between the broadband communication device and the broadband communication system;
    determining an audio quality parameter for at least one of the narrowband communication device and the broadband communication device;
    transmitting an audio signal of the call, over the PAN master-less communication link and in response to the audio quality parameter, from one to the other of the broadband communication device and the narrowband communication device; and
    wherein a first microphone of the narrowband communication device is dedicated to push to talk (PTT) services when simultaneously a second microphone of the narrowband communication device provides an audio input signal path to the broadband communication device, wherein the first microphone is an internal microphone of the narrowband communication device and the second microphone is an external microphone of the narrowband communication device.

2. The method of claim 1, wherein determining the audio quality parameter of the call comprises sampling an environmental acoustic background noise level or determining an audio signal quality.

3. The method of claim 1, wherein a first audio quality parameter is determined at the narrowband communication device and a second audio quality parameter is determined at the broadband communication device, and at least one of the first and second audio quality parameters is then shared between the broadband communication device and the narrowband communication device over the PAN master-less communication link.

4. The method of claim 1, further comprising:
    transmitting, in response to the audio quality parameter, an alert to the user indicating that the user should use alternative audio hardware of one of the broadband communication device and the narrowband communication device; and
    processing, at one of the broadband communication device and the narrowband communication device, a user initiated signal directing the audio signal of the call to be transmitted, over the PAN master-less communication link, from one to the other of the broadband communication device and the narrowband communication device.

5. The method of claim 4, wherein the audio hardware comprises a microphone and a speaker.

6. The method of claim 1, wherein transmitting the audio signal of the call from one to the other of the broadband communication device and the narrowband communication device occurs automatically in response to determining the audio quality parameter.

7. The method of claim 1, wherein pressing a PTT button of the narrowband communication device interrupts an audio input signal path to the broadband communication device, and wherein releasing the PTT button of the narrowband communication device restores the audio input signal path to the broadband communication device.

8. A broadband communication device, comprising: a processor; and
a memory operatively coupled to the processor, wherein the memory includes: computer readable program code components for pairing, over a personal area network (PAN) master-less communication link, a narrowband communication device operating in a narrowband communication system and the broadband communication device operating in a broadband communication system; computer readable program code components for establishing a call between the broadband communication device and the broadband communication system; computer readable program code components for processing an audio quality parameter at the broadband communication device; and computer readable program code components for processing an audio signal of the established call, transmitted over the PAN master-less communication and in response to the audio quality parameter, from the narrowband communication device to the broadband communication device: and wherein the narrowband communication device comprises of two microphones and a speaker having superior audio ratings than those of the broadband communication device, thereby enhancing audio quality of a call established on the broadband device; wherein a first microphone of the narrowband communication device is dedicated to push to talk (PTT) services when simultaneously a second microphone of the narrowband communication device provides an audio input signal path to the broadband communication device, wherein the first microphone is an internal microphone of the narrowband communication device and the second microphone is an external microphone of the narrowband communication device.

9. The broadband communication device of claim 8, wherein processing the audio quality parameter of the call comprises one of: sampling an environment background noise level; determining an audio signal quality; and receiving the audio quality parameter from the narrowband communication device.

10. The broadband communication device of claim 8, wherein a first audio quality parameter is determined at the narrowband communication device and a second audio quality parameter is determined at the broadband communication device, and the broadband communication device further includes computer readable program code components for sharing at least one of the first and second audio quality parameters between the broadband communication device and the narrowband communication device over the PAN master-less communication link.

11. The broadband communication device of claim 8, wherein the memory further includes:
computer readable program code components for transmitting, in response to the audio quality parameter, an alert to the user indicating that the user should use alternative audio hardware of the narrowband communication device; and
computer readable program code components for processing, at the broadband communication device, a user initiated signal directing the audio signal of the call to be transmitted, over the PAN master-less communication, from one to the other of the broadband communication device and the narrowband communication device.

12. The broadband communication device of claim 11, wherein the alternative audio hardware comprises a microphone and a speaker.

13. The broadband communication device of claim 8, wherein transmitting the audio signal of the call from one to the other of the broadband communication device and the narrowband communication device occurs automatically in response to determining the audio quality parameter.

14. A narrowband communication device, comprising: a processor; and
a memory operatively coupled to the processor, wherein the memory includes: computer readable program code components for pairing, over a personal area network (PAN) master-less communication link, the narrowband communication device operating in a narrowband communication system and a broadband communication device operating in a broadband communication system computer readable program code components for establishing a call between the narrowband communication device and the narrowband communication system; computer readable program code components for processing an audio quality parameter at the narrowband communication device; and computer readable program code components for processing an audio signal of the established call, transmitted over the PAN master-less communication link and in response to the audio quality parameter, from the broadband communication device to the narrowband communication device: and wherein the narrowband communication device comprises of two microphones and a speaker having superior audio ratings than those of the broadband communication device, thereby enhancing audio quality of a call established on the broadband device; wherein a first microphone of the narrowband communication device is dedicated to push to talk (PTT) services when simultaneously a second microphone of the narrowband communication device provides an audio input signal path to the broadband communication device, wherein the first microphone is an internal microphone of the narrowband communication device and the second microphone is an external microphone of the narrowband communication device.

15. The narrowband communication device of claim 14, wherein processing the audio quality parameter of the call comprises one of: sampling an environment background noise level; determining an audio signal quality; and receiving the audio quality parameter from the narrowband communication device.

16. The narrowband communication device of claim 14, wherein a first audio quality parameter is determined at the narrowband communication device and a second audio quality parameter is determined at the broadband communication device, and the narrowband communication device further includes computer readable program code components for sharing at least one of the first and second audio quality parameters between the broadband communication device and the narrowband communication device over the PAN master-less communication link.

17. The narrowband communication device of claim 14, wherein the memory further includes:
computer readable program code components for transmitting, in response to the audio quality parameter, an alert to the user indicating that the user should use alternative audio hardware of the broadband communication device; and
computer readable program code components for processing, at the narrowband communication device, a user initiated signal directing the audio signal of the call to be transmitted, over the PAN master-less communication link, from one to the other of the broadband communication device and the narrowband communication device.

18. A system for transferring audio between devices of a single user, the system comprising:

a narrowband communication device operating in a narrowband communication system; a broadband communication device operating in a broadband communication system; a personal area network (PAN) master-less communication link for communicating between the narrowband communication device and the broadband communication device; wherein at least one of the narrowband communication device and the broadband communication device determine an audio quality parameter and in response thereto transmit an audio signal of a call, over the PAN master-less communication link, from one to the other of the broadband communication device and the narrowband communication device: and wherein the narrowband communication device comprises of two microphones and a speaker having superior audio ratings than those of the broadband communication device, thereby enhancing audio quality of a call established on the broadband device; wherein a first microphone of the narrowband communication device is dedicated to push to talk (PTT) services when simultaneously a second microphone of the narrowband communication device provides an audio input signal path to the broadband communication device, wherein the first microphone is an internal microphone of the narrowband communication device and the second microphone is an external microphone of the narrowband communication device.

19. The system of claim 18, wherein the audio quality parameter is an environmental audio quality parameter.

20. The method of claim 1, wherein the audio quality parameter is an environmental audio quality parameter.

21. The broadband communication device of claim 8, wherein the audio quality parameter comprises an environmental audio quality parameter.

22. The narrowband communication device of claim 14, wherein the audio quality parameter is an environmental audio quality parameter.

* * * * *